United States Patent [19]
Tabata

[11] Patent Number: 6,081,351
[45] Date of Patent: Jun. 27, 2000

[54] IMAGE READING APPARATUS

[75] Inventor: Masami Tabata, Isehara, Japan

[73] Assignee: Canon Kabushiki Kaisha, Tokyo, Japan

[21] Appl. No.: 08/795,521

[22] Filed: Feb. 5, 1997

[30] Foreign Application Priority Data

Feb. 9, 1996 [JP] Japan ................................. 8-024338

[51] Int. Cl.[7] .............................. H04N 1/04; G02B 6/06; G02B 6/00
[52] U.S. Cl. ...................... 358/475; 358/484; 250/227.2; 250/227.26; 250/227.31
[58] Field of Search .................................... 358/498, 473, 358/475, 484, 474, 494; 382/59, 274; 355/228; 250/227.11, 208.1, 227.2, 227.26, 227.31; 359/656, 188, 195

[56] References Cited

U.S. PATENT DOCUMENTS

| | | | |
|---|---|---|---|
| 5,038,258 | 8/1991 | Koch et al. ............................... | 359/656 |
| 5,357,099 | 10/1994 | Tabata et al. ............................ | 358/475 |
| 5,499,112 | 3/1996 | Kawai et al. ............................ | 358/475 |
| 5,535,021 | 7/1996 | Chiang et al. ........................... | 358/474 |
| 5,818,033 | 10/1998 | Takeda et al. ........................... | 358/475 |

*Primary Examiner*—Scott Rogers
*Attorney, Agent, or Firm*—Fitzpatrick, Cella, Harper & Scinto

[57] ABSTRACT

It is an object to provide an image sensor which can guarantee a good picture quality by reducing an illuminance deviation and can effectively realize a miniaturization of an apparatus. There is an image sensor constructed by, an illuminating apparatus composed of a sensor IC having a group of photoelectric converting elements arranged in a line, a lens for forming an image of light information to the sensor IC, a light source, and an optical guide for guiding a light of a light source and emitting the light in a desired direction, and a frame for holding each of the above component elements. In such an image sensor, there is disclosed an image reading apparatus which uses both of an indirect light that is emitted from a diffusing surface of the optical guide of the illuminating apparatus and a direct light from the light source and in which a diffusing member for diffusing the direct light from the light source is provided between the light source and an original to be directly illuminated.

16 Claims, 6 Drawing Sheets

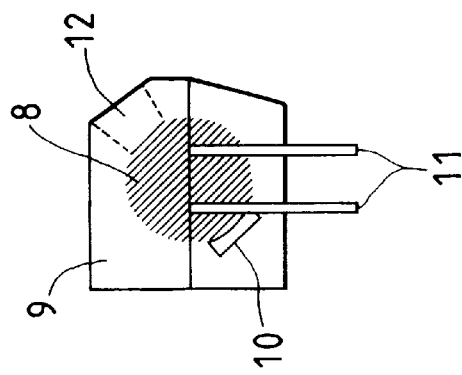
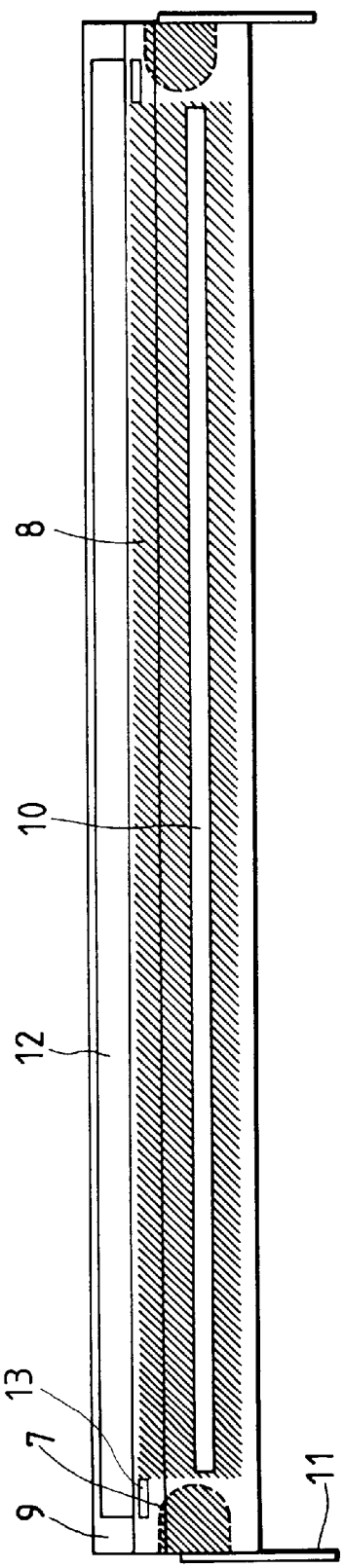
FIG. 6A
FIG. 6B

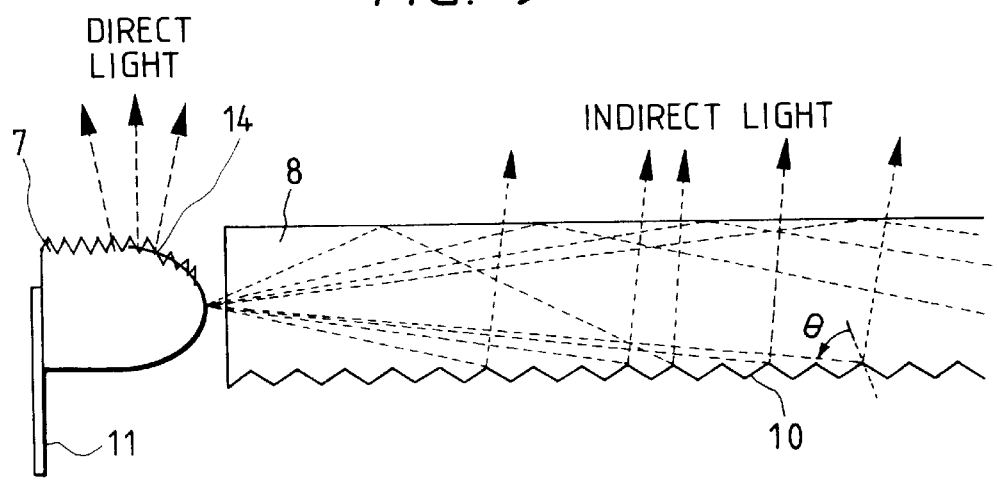
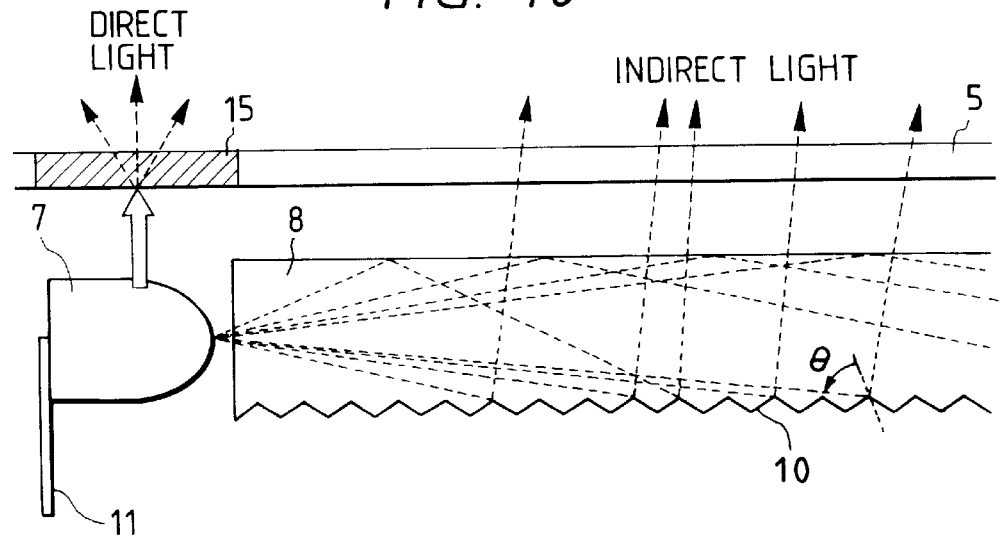

IMAGE READING APPARATUS

BACKGROUND OF THE INVENTION

1. Field of the Invention

The invention relates to an image reading apparatus such as scanner, facsimile, or the like.

2. Related Background Art

As an illuminating apparatus which is used in an image reading apparatus such as scanner, facsimile, or the like, an apparatus with a structure as shown in FIGS. 1A and 1B has been proposed. FIG. 1A shows a cross sectional view of the illuminating apparatus and FIG. 1B is a diagram when it is seen from the longitudinal direction. As shown in the diagram, in the illuminating apparatus, an LED 7 of a lead frame type is used as a light source. The LEDs 7 are arranged at both edges of an optical guide 8 for guiding an irradiation light. FIG. 2 is an internal constructional diagram for explaining an internal structure of the illuminating apparatus in detail. In FIG. 2, the optical guide 8 guides, in the longitudinal direction. the irradiation light of the LED 7 which is lit on by being supplied with an electric power by lead wires 11. The guided light repeats the internal reflection in the optical guide 8. The light is reflected by a diffusing surface 10 provided in the longitudinal direction of the optical guide 8 and irradiates an original to be read in a line shape.

The LEDs 7 and optical guide 8 are positioned and held by a housing 9. An opening portion (slit) 12 corresponding to a length of original is formed in the housing 9 so that the light reflected by the diffusing surface 10 irradiates the original to be read. In order to reduce the whole length of illuminating apparatus as short as possible and to assure an effective length adapted to read the original as shown in FIG. 1B, the length of opening portion 12 is not limited to the length of optical guide 8 but the opening portion 12 is extended to a position where the LEDs 7 as light sources can be directly seen, thereby allowing the direct lights from the light sources to be contributed to the illumination of the original.

However, when it is tried to irradiate the original by using the direct light of the LED light source, there are the following problems.

(1) As shown in FIG. 3, since an illuminance of a portion where the direct light of the light source is irradiated is remarkably higher than that of a portion where the indirect light from the optical guide is irradiated, a variation in illuminance occurs on a reading line of the original. When an illuminance deviation increases as mentioned above, when the read image is outputted by an image output apparatus, a problem on a picture quality occurs.

(2) To eliminate such an illuminance deviation, if the light source is shut off so that the direct light of the light source does not irradiate the original, the light source portion becomes a dead space on the illuminating apparatus, so that an illumination width enough to irradiate the original cannot be assured.

(3) When it is intended to mechanically assure the original illumination width, a whole length of illuminating apparatus becomes remarkably long, so that a size of image reading apparatus is enlarged.

SUMMARY OF THE INVENTION

It is an object of the invention to enable an image to be read at a high quality.

Another object of the invention is to miniaturize an image reading apparatus.

Still another object of the invention is to assure an enough illumination width without enlarging a size of an illuminating apparatus.

Further another object of the invention is to suppress an illuminance variation of the illuminating apparatus.

To accomplish the above objects, according to an embodiment of the invention, there is provided an image reading apparatus comprising: an illuminating apparatus which is constructed by a light source, an optical guide for guiding an irradiation light of the light source and irradiating a predetermined direction, and illuminance adjusting means for reducing a difference between an illuminance of an indirect light which is emitted from the optical guide and an illuminance of a direct light which is emitted from the light source and which irradiates an object to be read; and photoelectric converting means for converting light information from the object irradiated by the illuminating apparatus into an image signal.

According to another embodiment of the invention, the illuminating apparatus for reading an image is constructed by: a light source; an optical guide for guiding an irradiation light of the light source and irradiating a predetermined direction; and illuminance adjusting means for reducing a difference between an illuminance of an indirect light which is emitted from the optical guide and an illuminance of a direct light which is emitted from the light source.

With the above construction, the original illumination width can be assured without enlarging the illuminating means and the illuminance variation can be also reduced. An image of a high quality can be read.

The above and other objects and features of the present invention will become apparent from the following detailed description and the appended claims with reference to the accompanying drawings.

BRIEF DESCRIPTION OF THE DRAWINGS

FIG. 6A is a cross sectional view showing a construction of an illuminating apparatus according to the image sensor of the invention;

FIG. 6B is a side elevational view of the apparatus of FIG. 6A;

FIG. 9 is a detailed diagram of an optical guide according to the second embodiment of an image sensor of the invention; and FIG. 10 is a detailed diagram of an optical guide according to the third embodiment of an image sensor of the invention.

DETAILED DESCRIPTION OF THE PREFERRED EMBODIMENTS

Preferred embodiments of an image sensor of the invention will now be described hereinbelow with reference to the drawings.

Figure 1A:
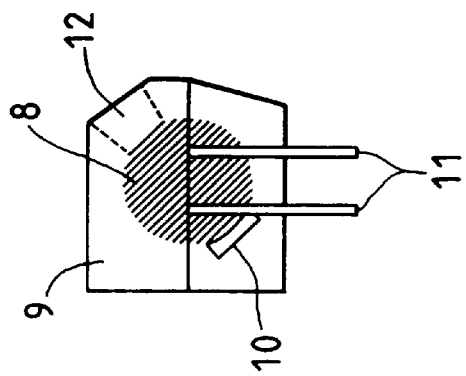
FIG. 1A is a cross sectional view showing a construction of an illuminating apparatus according to an image sensor of a related art.
Figure 1B:
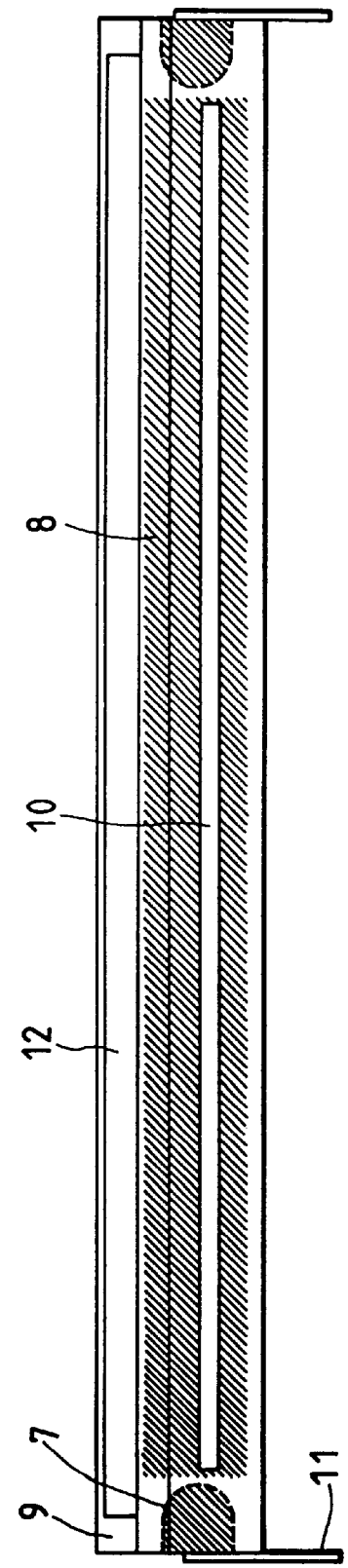
FIG. 1B is a side elevational view of the apparatus of FIG. 1A.
Figure 2:
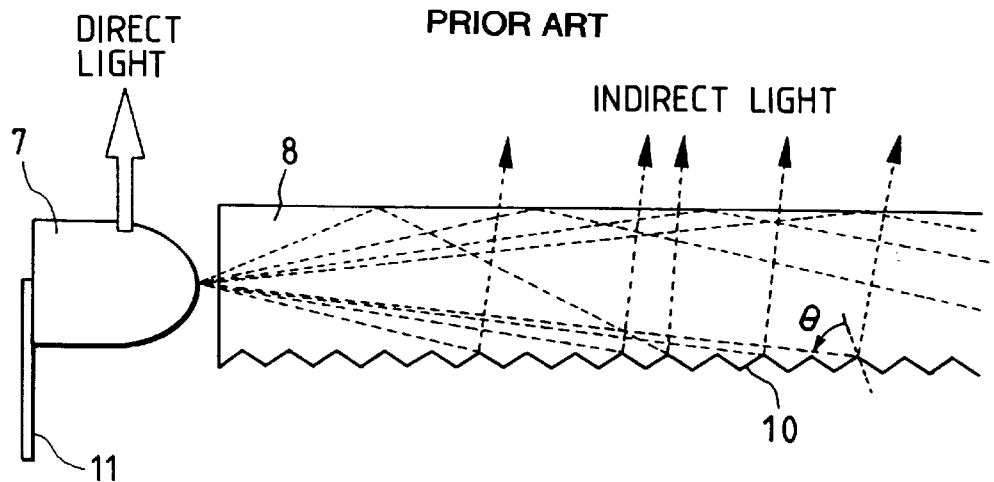
FIG. 2 is a detailed diagram of an optical guide according to the image sensor of the related art.
Figure 3:
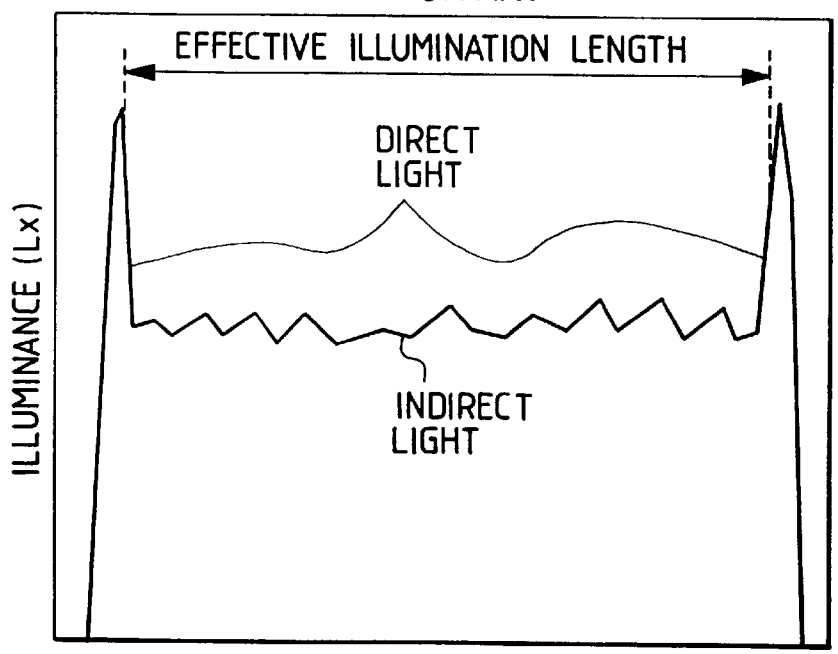
FIG. 3 is a diagram showing an illuminance distribution on an original reading line in the image sensor of the related art.
Figure 4:
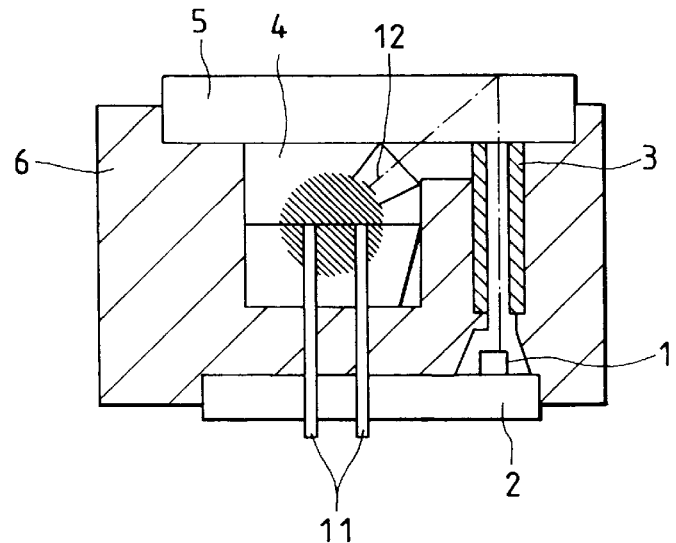
FIG. 4 is a cross sectional view of an embodiment of an image sensor according to the invention.
Figure 5:
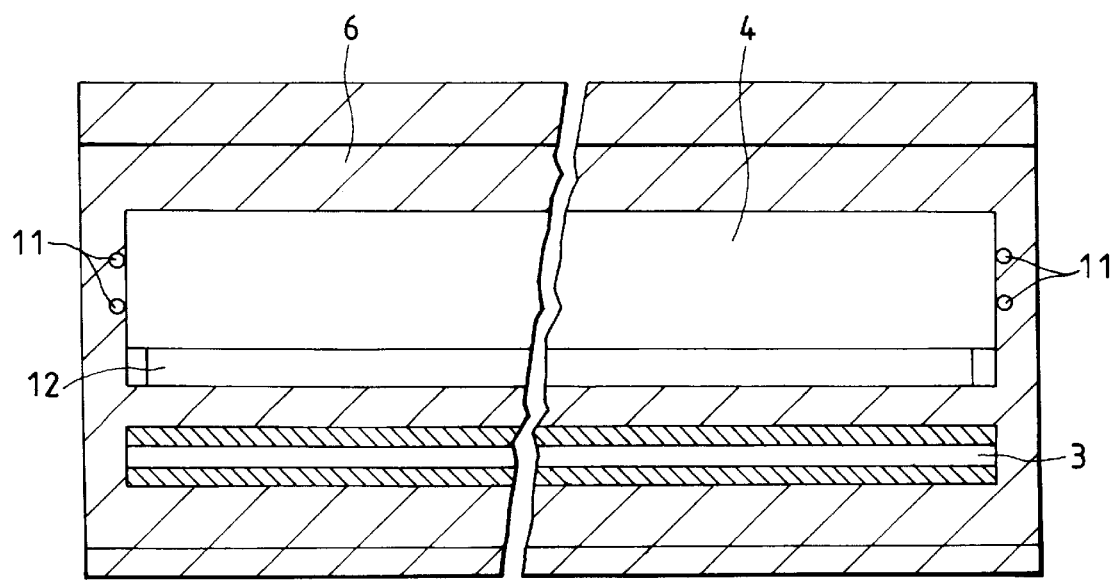
FIG. 5 is a top view of the embodiment of the image sensor according to the invention.

FIGS. 4 and 5 show a construction of an image sensor according to the embodiment and are a cross sectional view and a top view. The image sensor comprises: a sensor array 2 constructed in a manner such that a plurality of sensor ICs 1 each having a group of line-shaped photoelectric converting elements are accurately arranged in a line on a board made of a glass epoxy material or the like in correspondence to a length of original to be read; a lens array 3; an illuminating apparatus 4; a cover glass 5 made of a light transparency material for supporting the original; and a frame 6 made of a material like a metal such as aluminum or the like or a resin such as polycarbonate or the like for positioning and holding those component elements.

A function of each component element constructing the above image sensor will now be described. The illuminating apparatus 4 to which an electric power is supplied from the lead wires 11 irradiates a light from an oblique direction of about 45° to the original supported by the cover glass 5. Light information from the illuminated original is formed as an image onto the sensor ICs 1 by the lens array 3. The sensor ICs 1 convert the light information into electric signals and transmit to the system.

A method of manufacturing the image sensor according to the embodiment will now be described.

The lens array 3 and illuminating apparatus 4 are respectively inserted from the upper side to predetermined positions of the frame 6 in FIG. 4. In this case, in the illuminating apparatus 4, three sides of a hexagonal cross section of the housing 9 are respectively come into contact with the horizontal and vertical surfaces of the frame 6, thereby enabling the positioning in the rotating direction of an optical axis to be accurately executed.

As shown in FIG. 4, the cover glass 5 is approximately arranged on the same plane of an upper surface of the illuminating apparatus 4 and an upper surface of the lens array 3 which were inserted to the frame 6 and is adhered by an adhesive agent or the like onto two surfaces in the longitudinal direction of the frame 6 which were set so as to sandwich the illuminating apparatus 4 and lens array 3. In this case, since the upper surface of the illuminating apparatus 4 is the horizontal surface, it is approximately in contact with the surface of the cover glass 5 in parallel. Therefore, by adhering the frame 6 and cover glass 5 as mentioned above, the illuminating apparatus 4 can be simultaneously fixed without being rickety.

Subsequently, the sensor array 2 is fitted from the lower side into the frame 6 and they are adhered by an adhesive agent or the like, thereby completing the image sensor.

FIGS. 6A and 6B are a cross sectional view and a top view showing a detailed construction of the illuminating apparatus 4. As shown in the diagrams, the illuminating apparatus 4 is constructed by: the LEDs 7 of the lead frame type as light sources; the cylindrical optical guide 8 made of a light transparency material such as an acrylic resin or the like; and a housing 9 having a hexagonal cross sectional shape for positioning and holding the LEDs 7 and optical guide 8.

The LEDs 7 are arranged at both edges of the optical guide 8 so as to enable the lights to efficiently enter the optical guide 8. The light entering the optical guide 8 repeats an internal reflection and irradiates in the direction of the original by the diffusing surface 10. A diffusing member 13 to diffuse a direct light which does not enter the optical guide 8 from the light source is provided at a position where the light source (LED 7) and the original are sandwiched, thereby uniforming an illuminance of the direct light and an illuminance of an indirect light which is emitted from the optical guide 8. As a diffusing member 13, it is preferable to use a diffusing member whose surface is formed by concave and convex surface or a diffusing member in which a diffusing agent is mixed. The diffusing member 13 can be easily manufactured by a method of adhering it to the optical guide 8, housing 9, or the like, a method of integratedly injection molding together with the optical guide 8, or the like. In addition, adjustment of the illuminance of the direct light and the illuminance of the indirect light can be also attained by providing a light-shielding member which shields a portion of the light source from light, instead of providing the diffusing member.

In the housing 9 for positioning and holding the LEDs 7 and optical guide 8, the slit 12 to transmit the light is formed on one side in the direction of the light emission in the hexagonal cross sectional surface. As a color of the housing 9, a whitish color having a high reflecting efficiency of the light is preferable so as to assure a light quantity. The housing 9 is made of a material such as an ABS resin or the like.

Figure 7:
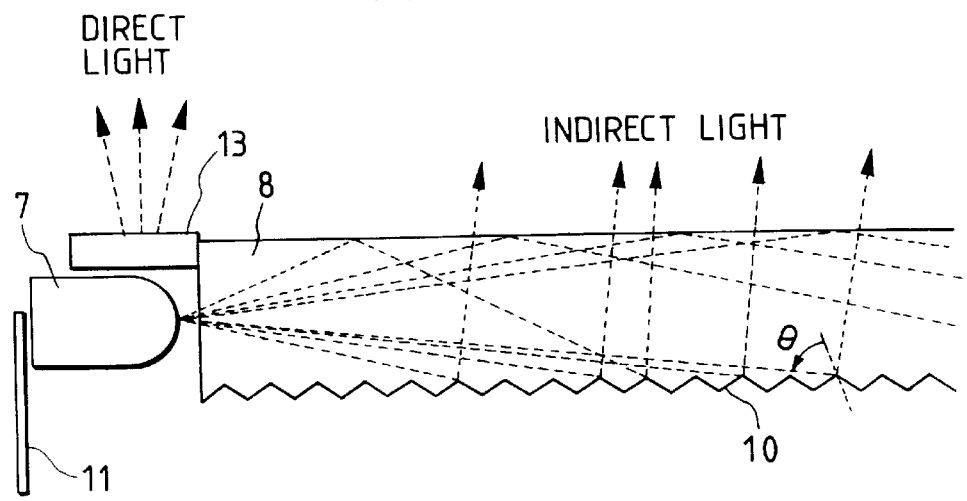
FIG. 7 is a detailed diagram of an optical guide according to the image sensor of the invention.

FIG. 7 is a diagram showing an internal construction of the illuminating apparatus 4. On the diffusing surface 10 provided for the optical guide 8, a fine saw-toothed shape as shown in FIG. 7 is continuously formed in the longitudinal direction of the optical guide 8. The light entering at an incident angle e to the saw-toothed surface which is equal to or higher than 41° (in the case where the optical guide 8 is made of an acrylic resin and its refractive index n=1.5) satisfies the conditions of the total reflection angle and can be emitted in a desired direction.

Figure 8:
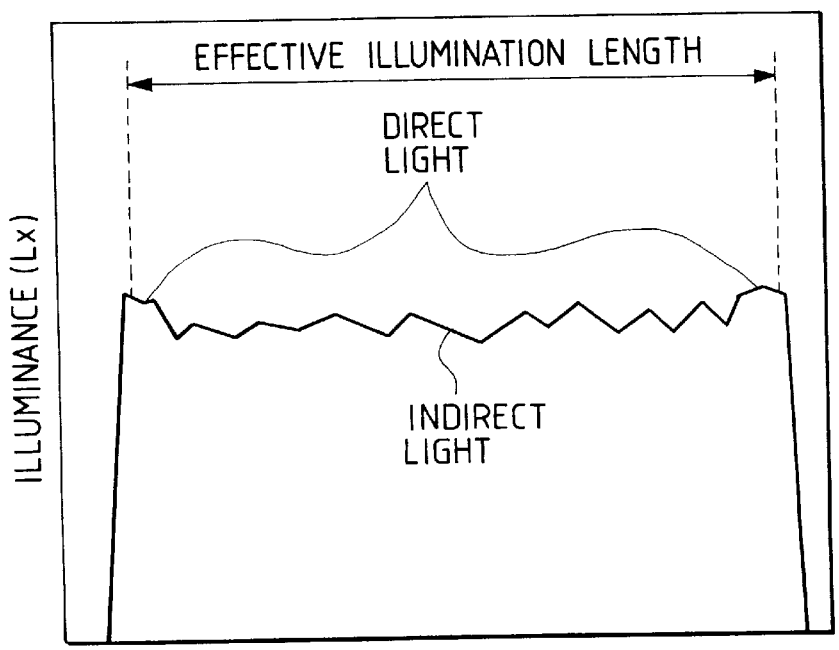
FIG. 8 is a diagram showing an illuminance distribution on an original reading line in the embodiment of the invention.

FIG. 8 is a diagram of an illuminance distribution on an original reading line of the image sensor of the invention.

In the image sensor of the invention, since the diffusing member 13 to diffuse the direct light from the light source is provided at the position which is sandwiched by the LED as a light source and the original, as shown in FIG. 8, the illuminance of the direct light and the illuminance of the indirect light which is emitted from the optical guide 8 can be uniformed.

The second embodiment in an image sensor of the invention will now be described with reference to FIG. 9.

As shown in FIG. 9, an LED chip of a cannonball shape which is packaged by a light transparency resin of the lead frame type is used as a light source 7. In the embodiment, the surface on the side where the original is directly irradiated in the package made of the light transparency resin is used as a concave and convex surface 14 as shown in the diagram, thereby diffusing the direct light. By forming the concave and convex surface 14 in the package as mentioned above, an intensity of the direct light of the light source and an intensity of the light that is irradiated from the optical guide 8 can be matched.

The concave and convex surface 14 of the light source 7 can be easily manufactured by forming it by a thermal pressing method after the package was molded or by forming a predetermined concave and convex surface on a die for molding a package.

In each of the foregoing embodiments, as shown in FIG. 10, a similar effect can be also derived by providing a diffusing portion 15 constructed in a manner similar to the above at the position on the cover glass (light transparency material for supporting the original) 5 where it is sandwiched by the light source 7 and the original that is directly illuminated by the light source 7. The invention can be also effectively applied to an image sensor using a lens of a reduction system.

According to the invention as described above, by using both of the indirect light which is emitted from the diffusing surface of the optical guide of the illuminating apparatus and the direct light from the light source and by providing the diffusing portion at a position between the light source and the original to be directly illuminated in order to diffuse the direct light from the light source, particularly, the following effects can be obtained. Namely, (1) The illuminance deviation on the reading line of the original can be eliminated and a good image signal of the original can be obtained, (2) The illuminating apparatus can be miniaturized and the invention can contribute to a miniaturization as one of the distinguishing elements such as facsimile, copying apparatus, and the like as final products.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   (a) an illuminating apparatus comprising a light source, an optical guide for guiding an irradiation light of said light source and irradiating a predetermined direction, wherein said light source is arranged in an edge portion of said optical guide, and illuminance adjusting means for reducing an illuminance of the irradiation light from said light source incident not into said optical guide but directly onto an object to be read; and
   (b) photoelectric converting means for converting light information from said object irradiated by said illuminating apparatus into an image signal.

2. An apparatus according to claim 1, wherein said illuminance adjusting means is arranged between said light source and said object that is irradiated by said direct light.

3. An apparatus according to claim 1, wherein said illuminance adjusting means is constructed in a part of said optical guide.

4. An apparatus according to claim 1, further having a mounting base plate for mounting said object.

5. An apparatus according to claim 4, wherein said illuminance adjusting means is constructed in a part of said mounting base plate.

6. An apparatus according to claim 1, wherein said illuminance adjusting means is constructed in a part of said light source.

7. An apparatus according to claim 1, further having a lens for forming an image of the light information from said object irradiated by said illuminating apparatus onto said photoelectric converting means.

8. An apparatus according to claim 1, wherein reflecting means for irradiating the guided light in a predetermined direction is provided for said optical guide.

9. An illuminating apparatus for reading an image, comprising:
   (a) a light source;
   (b) an optical guide for guiding an irradiation light of said light source and irradiating a predetermined direction, wherein said light source is arranged in an edge portion of said optical guide; and
   (c) illuminance adjusting means for reducing an illuminance of the irradiation light from said light source incident not into said optical guide but directly onto an object to be read.

10. An apparatus according to claim 9, wherein said illuminance adjusting means is arranged between said light source and said object that is irradiated by said direct light.

11. An apparatus according to claim 9, wherein said illuminance adjusting means is constructed in a part of said optical guide.

12. An apparatus according to claim 9, further having a mounting base plate for mounting said object.

13. An apparatus according to claim 12, wherein said illuminance adjusting means is constructed in a part of said mounting base plate.

14. An apparatus according to claim 9, wherein said illuminance adjusting means is constructed in a part of said light source.

15. An apparatus according to claim 9, further having a lens for forming an image of the light information from said object irradiated by said illuminating apparatus onto said photoelectric converting means.

16. An apparatus according to claim 9, wherein reflecting means for irradiating the guided light in a predetermined direction is provided for said optical guide.

* * * * *